US009239017B2

(12) United States Patent
McDonald (10) Patent No.: US 9,239,017 B2
(45) Date of Patent: Jan. 19, 2016

(54) STOP-START CONTROL SYSTEMS FOR ENGINES WITH FULLY FLEXIBLE VALVE ACTUATION SYSTEM

(75) Inventor: Mike M. McDonald, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 849 days.

(21) Appl. No.: 13/286,667

(22) Filed: Nov. 1, 2011

(65) Prior Publication Data

US 2013/0110383 A1 May 2, 2013

(51) Int. Cl.
| | |
|---|---|
| F02D 13/08 | (2006.01) |
| F02D 41/04 | (2006.01) |
| F02D 41/06 | (2006.01) |
| F02D 17/04 | (2006.01) |
| F02D 41/00 | (2006.01) |

(52) U.S. Cl.
CPC .............. *F02D 13/08* (2013.01); *F02D 17/04* (2013.01); *F02D 41/0055* (2013.01); *F02D 41/042* (2013.01); *F02D 41/062* (2013.01); *F02D 41/0005* (2013.01); *Y02T 10/18* (2013.01); *Y02T 10/47* (2013.01)

(58) Field of Classification Search
CPC ..... F02D 13/08; F02D 17/04; F02D 41/0005; F02D 41/0055; F02D 41/042; F02D 41/062; Y02T 10/18; Y02T 10/47
USPC ......... 123/179.3, 179.4, 179.16, 179.18, 481, 123/198 F, 325, 332; 701/112
See application file for complete search history.

(56) References Cited

U.S. PATENT DOCUMENTS

| | | | | |
|---|---|---|---|---|
| 4,175,534 | A | 11/1979 | Jordan | |
| 5,079,945 | A | 1/1992 | Hansen et al. | |
| 5,803,040 | A | 9/1998 | Biesinger et al. | |
| 6,073,440 | A * | 6/2000 | Douta et al. | 60/277 |
| 6,467,443 | B1 | 10/2002 | Tsuruta et al. | |
| 6,578,550 | B1 | 6/2003 | Rupp et al. | |
| 6,763,298 | B2 * | 7/2004 | Boggs et al. | 701/112 |
| 6,918,376 | B2 * | 7/2005 | Oono et al. | 123/458 |
| 6,988,572 | B2 | 1/2006 | Tatara et al. | |
| 7,167,792 | B1 * | 1/2007 | Kolmanovsky et al. | 701/112 |
| 7,240,663 | B2 * | 7/2007 | Lewis et al. | 123/321 |
| 7,258,101 | B1 | 8/2007 | McDonald et al. | |
| 7,316,219 | B2 | 1/2008 | Yamaguchi et al. | |
| 7,540,344 | B2 | 6/2009 | Yamamoto et al. | |
| 7,571,709 | B2 * | 8/2009 | Lewis et al. | 123/320 |
| 7,640,907 | B2 | 1/2010 | Nakamura | |
| 7,669,569 | B2 | 3/2010 | Tamai et al. | |

(Continued)

FOREIGN PATENT DOCUMENTS

| | | |
|---|---|---|
| CN | 101091050 A | 12/2007 |
| CN | 101769209 A | 7/2010 |

(Continued)

*Primary Examiner* — Erick Solis
*Assistant Examiner* — Carl Staubach (57) ABSTRACT

A vehicle system includes a stop-start command module and a cylinder control module. The stop-start command module is configured to detect an autostop request and generate a mode signal based on the autostop request. The cylinder control module is configured to sequentially disable cylinders of an engine during an autostop mode based on the mode signal. The cylinders of the engine include respective intake valves and exhaust valves. The cylinder control module is configured to maintain the intake valves in a closed state and the exhaust valves in an open state during the autostop mode and during multiple cycles of a crankshaft of the engine.

18 Claims, 4 Drawing Sheets

(56) References Cited

U.S. PATENT DOCUMENTS

| | | |
|---|---|---|
| 7,975,534 B2 | 7/2011 | McDonald et al. |
| 8,140,247 B2 * | 3/2012 | Gibson et al. ............... 701/113 |
| 8,290,692 B2 * | 10/2012 | Kitano et al. ............... 701/113 |
| 8,326,519 B2 | 12/2012 | McDonald et al. |
| 8,370,051 B2 * | 2/2013 | Pursifull et al. ............ 701/112 |
| 8,676,479 B2 * | 3/2014 | Pursifull et al. ............ 701/112 |
| 2003/0140881 A1 * | 7/2003 | Makajima et al. ......... 123/179.3 |
| 2005/0203695 A1 | 9/2005 | Kassner |
| 2005/0212509 A1 | 9/2005 | Asama |
| 2006/0037578 A1 | 2/2006 | Nakamura |
| 2006/0102112 A1 | 5/2006 | Phlips et al. |
| 2006/0162701 A1 | 7/2006 | Kassner |
| 2006/0207567 A1 | 9/2006 | Yamaguchi et al. |
| 2007/0084429 A1 * | 4/2007 | Taki et al. ............... 123/179.4 |
| 2008/0173079 A1 | 7/2008 | McGee et al. |
| 2008/0268726 A1 | 10/2008 | Akuzawa |
| 2010/0063713 A1 | 3/2010 | Albertson et al. |
| 2010/0114462 A1 | 5/2010 | Gibson et al. |
| 2010/0212629 A1 | 8/2010 | McDonald et al. |
| 2010/0241302 A1 | 9/2010 | Shimizu |
| 2010/0284823 A1 | 11/2010 | Reynolds et al. |
| 2011/0251776 A1 * | 10/2011 | Bartell et al. ............... 701/103 |

FOREIGN PATENT DOCUMENTS

| | | |
|---|---|---|
| DE | 10211119 A1 | 9/2003 |
| DE | 102005039663 A1 | 3/2006 |
| DE | 102009040549 A1 | 7/2010 |
| EP | 1344901 A2 | 9/2003 |
| JP | 57086512 | 5/1982 |
| JP | 2006144792 A | 6/2006 |

* cited by examiner

STOP-START CONTROL SYSTEMS FOR ENGINES WITH FULLY FLEXIBLE VALVE ACTUATION SYSTEM

FIELD

The present disclosure relates to engine stop-start systems, and more particularly to systems that control engine operations during an autostop and an autostart of an engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A stop-start vehicle includes an internal combustion engine (ICE) and a transmission. If the stop-start vehicle is, for example, a hybrid electric vehicle (HEV) and/or regenerates electrical energy, the stop-start vehicle may also include one or more electric motors. The stop-start vehicle may shutdown (deactivate) the ICE to reduce the amount of time the ICE is idling. This improves fuel economy and reduces emissions. The ICE may be shutdown (referred to as an autostop) when vehicle speed is less than a threshold for a predetermined period.

During an autostop, an ICE of a stop-start system may be shutdown and/or transitioned to an at rest state (i.e. engine speed is equal to 0 revolutions/second). The ICE may be automatically started (referred to as an autostart), for example, when an accelerator pedal is actuated and/or an automatic transmission is transitioned from a drive (D) position. For example, when an accelerator pedal is pushed from an at rest position and/or a shifter of an automatic transmission is transitioned from a drive (D) position to a neutral (N) position, a reverse (R) position, a first gear (D1) position, a second gear (D2) position, etc., an autostart is performed to reactivate the ICE.

SUMMARY

A vehicle system is provided and includes a stop-start command module and a cylinder control module. The stop-start command module is configured to detect an autostop request and generate a mode signal based on the autostop request. The cylinder control module is configured to sequentially disable cylinders of an engine during an autostop mode based on the mode signal. The cylinders of the engine include respective intake valves and exhaust valves. The cylinder control module is configured to maintain the intake valves in a closed state and the exhaust valves in an open state during the autostop mode and during multiple cycles of a crankshaft of the engine.

A method is provided and includes detecting an autostop request and generating a mode signal based on the autostop request. Cylinders of an engine are sequentially disabled during an autostop mode based on the mode signal. The cylinders of the engine include respective intake valves and exhaust valves. The intake valves are maintained in a closed state and the exhaust valves are maintained in an open state during the autostop mode and during multiple cycles of a crankshaft of the engine.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Although the terms first, second, third, etc. may be used herein to describe various elements, components, signals and/or modules, these elements, components, signals and/or modules should not be limited by these terms. These terms may be only used to distinguish one element, component, signal and/or module from another element, component, signal and/or module. Terms such as "first," "second," and other numerical terms when used herein do not imply a sequence or order unless clearly indicated by the context. Thus, a first element, component, signal and/or module discussed below could be termed a second element, component, signal and/or module without departing from the teachings of the example implementations.

During a shutdown of a stop-start engine, cylinders within the engine are deactivated (fuel and spark disabled). The speed of the engine is reduced to 0 revolutions-per-minute (RPM). While shutting down, air is pumped into and out of the cylinders via intake and exhaust valves. This can cause temperature of a catalyst of an exhaust system of the engine to decrease in temperature and/or cause oxygen $O_2$ to build up in a catalyst. A catalyst is less efficient when temperature of the catalyst is less than a predetermined operating temperature. Also, during a restart of the engine, extra fuel may be injected in the engine and therefore the exhaust system to remove the oxygen built up in the catalyst. This decreases fuel economy of the engine.

Also, during a shutdown of a stop-start engine, torque output of the engine can vary due to compression of air in the cylinders of the engine. This can result in vibrations in the engine and/or corresponding vehicle. In addition, reverse torque can be applied to the crankshaft due to the pressures applied on the pistons when compressing air within the cylinders. This can cause the engine to temporarily rotate in a reverse direction.

The below disclosed implementations overcome the above-stated issues, which can be associated with a stop-start engine.

Figure 1:
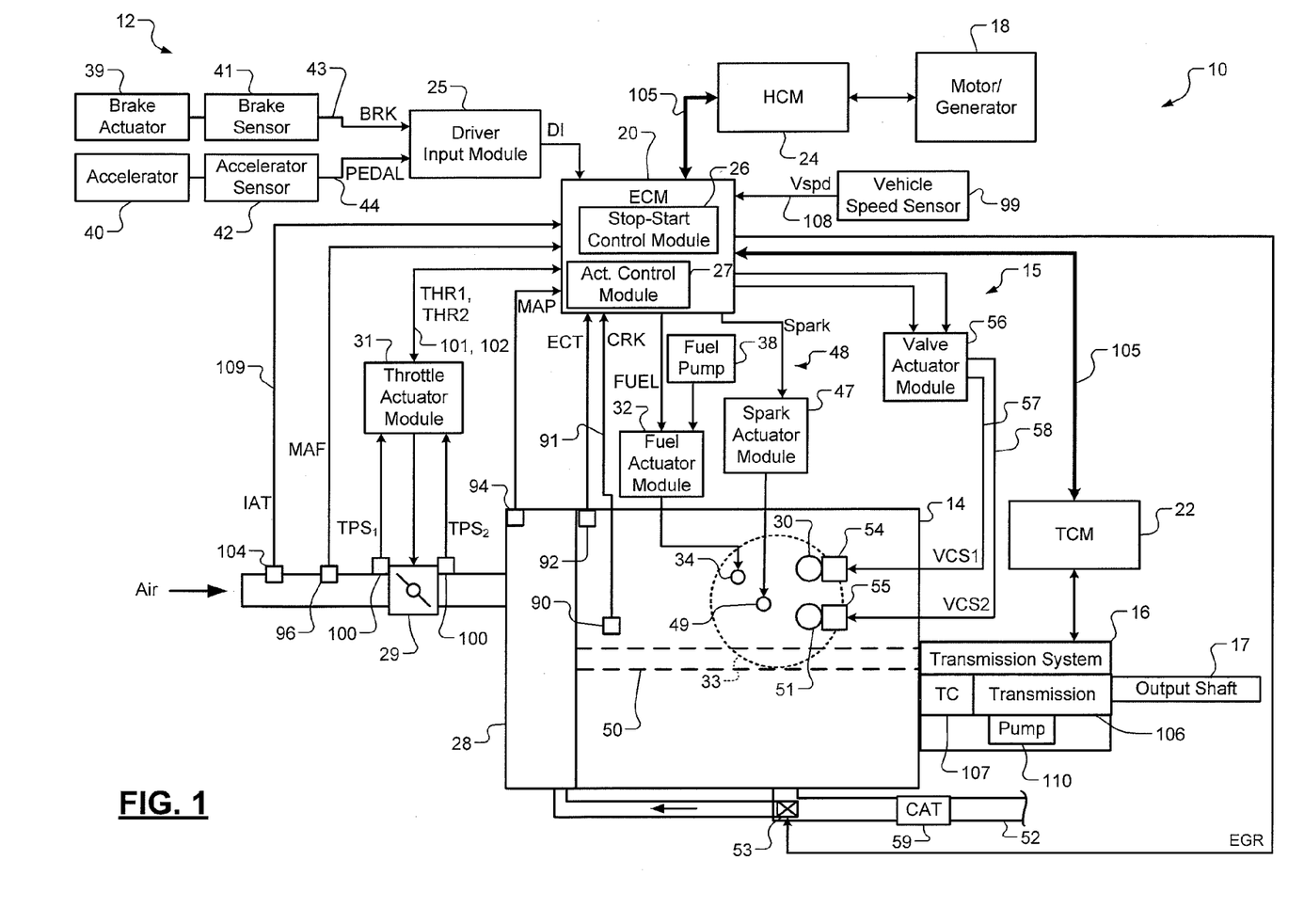
FIG. 1 is a functional block diagram of a vehicle system incorporating a stop-start system in accordance with the present disclosure.

In FIG. 1, a vehicle system 10 that includes a stop-start system 12 is shown. Although the vehicle system 10 is shown as a hybrid electric vehicle (HEV) system, the stop-start system 12 may be applied to other vehicle systems. The vehicle system 10 includes an internal combustion engine (ICE) 14 with a fully flexible valve actuation (FFVA) system 15, a transmission system 16, an electric motor and/or generator (motor/generator) 18 which are controlled respectively by an engine control module (ECM) 20, a transmission control module (TCM) 22, and a hybrid control module (HCM) 24. The HCM 24 may be, for example, a belt, alternator, starter (BAS) power inverter module (BPIM).

The stop-start system 12 includes one or more of the control modules 20, 22, 24, a stop-start control module 26, and an actuator control module 27. The stop-start control module 26 and the actuator control module 27 may be part of the ECM 20, part of another control module of the vehicle system 10, and/or may be separate control modules that communicate with the ECM 20. The stop-start control module 26 controls engine operations during autostarts and autostops of the ICE 14.

An autostart is performed when one or more of a first set of conditions are satisfied. An autostop is performed when one or more of a second set of conditions are satisfied to conserve fuel and provide requested torque to drive a vehicle. Parameters evaluated when determining whether to perform the autostop may be similar or the same as the parameters evaluated when determining whether to inhibit an autostop. Example parameters are disclosed below. The first and second sets of conditions are described in more detail below with respect to FIG. 2.

The vehicle system 10 and the stop-start system 12 operate in an autostart mode (or a restart mode) and an autostop mode (or shutdown mode). During the autostop mode, speed of the ICE 14 is decreased and fuel and spark of the ICE 14 are deactivated. During the autostop mode, the ICE 14 will coast down until it is stopped (stalled state). The ICE 14 is deactivated and speed of the ICE 14 is decreased to 0 RPM. The speed of the ICE 14 is equal to 0 RPM when, for example, the crankshaft of the ICE 14 is not rotating. The ICE 14 may be considered shutdown when fuel (or fuel system) and spark (or ignition system) are deactivated. During the autostart mode, the ICE 14 may be cranked (crank state) and speed of the ICE 14 may be increased to an idle speed (idle state). Fuel and spark are activated during the autostart mode.

While a spark ignition direct injection (SIDI) type engine is described herein, the present disclosure is applicable to other types of torque producers, such as gasoline type engines, gaseous fuel type engines, diesel type engines, propane type engines, and hybrid type engines. The ICE 14 combusts an air/fuel mixture to produce drive torque for a vehicle based on information from a driver input module 25 (e.g., driver input signal DI) and other information described below. The ICE 14 may be a 4-stroke engine where the piston is cycled iteratively through intake, compression, power/expansion and compression strokes.

In operation, air is drawn into an intake manifold 28 of the ICE 14 through a throttle valve 29 and/or a one or more intake valve(s) 30 of the FFVA system 15. The ECM 20 commands a throttle actuator module 31 to regulate opening of the throttle valve 29 to control the amount of air drawn into the intake manifold 28 based on, for example, information from the driver input module 25. The vehicle system 10 may not include the throttle valve 29 and the throttle actuator module 31. The ECM 20 commands a fuel actuator module 32 to control the amount of fuel injected into the intake manifold 28, intake runner, and/or a cylinder 33, via for example a fuel injector 34. Fuel injectors of the ICE 14 are identified as 34.

Fuel may be pumped to the fuel injector 34 via one or more fuel pumps, such as the fuel pump 38. The fuel pumps may include a high-pressure fuel pump and a low-pressure fuel pump, where the fuel pump 38 is the high-pressure fuel pump and provides fuel at a high-pressure to a fuel rail (shown in FIG. 3) of the fuel injector 34. Although a single cylinder is shown, the ICE 14 may include any number of cylinders with corresponding injectors and intake and exhaust valves.

The driver input module 25 may receive signals from, for example, sensors of a brake actuator 39 (e.g., brake pedal) and/or an accelerator 40 (e.g., accelerator pedal). The sensors may include a brake sensor 41 and an accelerator pedal sensor 42. The driver input signal DI may include a brake pedal signal BRK 43 and an accelerator pedal signal PEDAL 44. Air from the intake manifold 28 is drawn into the cylinder 33 through an intake valve 30.

The ECM 20 controls the amount of fuel injected into the intake manifold 28 and/or the cylinder 33. The injected fuel mixes with the air and creates the air/fuel mixture in the cylinder 33. A piston (not shown) within the cylinder 33 compresses the air/fuel mixture. Based upon a signal from the ECM 20, a spark actuator module 47 of an ignition system 48 energizes a spark plug 49 in the cylinder 33, which ignites the air/fuel mixture.

The combustion of the air/fuel mixture drives the piston down, thereby driving a rotating crankshaft 50. The piston then begins moving up again and expels the byproducts of combustion through an exhaust valve 51 of the FFVA system 15. The byproducts of combustion are exhausted from the vehicle via an exhaust system 52. The exhaust system 52 may include an exhaust gas recirculation (EGR) valve 53, which may be used to recirculate exhaust gas from the exhaust system 52 back to the intake manifold 28 and/or cylinders of the ICE 14 (e.g., the cylinder 33). Exhaust gas passes through a catalyst 59 prior to being released to the atmosphere.

The intake and exhaust valves 30, 51 may be electronically controlled by a valve actuator module 56 via valve actuators 54, 55. The valve actuator module 56 may generate valve control signals VCS1 57, VCS2 58 to control position of the valves 30, 51. The valve actuators 54, 55 may include solenoids. The ECM 20 may control individual position of each of the intake and exhaust valves 30, 51 during autostart and autostop modes.

The vehicle system 10 may detect the position and measure the speed of the crankshaft 50 (engine speed) using one or more engine position and/or speed sensor(s) 90. In one implementation, a single sensor with a single sensing element is used to detect position and speed of the crankshaft 50. The speed sensor 90 may generate a crankshaft signal CRK 91. Temperature of the ICE 14 may be measured using an engine coolant or oil temperature (ECT) sensor 92.

The pressure within the intake manifold 28 may be measured using a manifold absolute pressure (MAP) sensor 94. In various implementations, engine vacuum may be measured, where engine vacuum is the difference between ambient air pressure and the pressure within the intake manifold 28. The mass of air flowing into the intake manifold 28 may be measured using a mass air flow (MAF) sensor 96. The ECM 20 determines cylinder fresh air charge primarily from the MAF sensor 96 and calculates a desired fuel mass using open loop, closed loop and transient fueling algorithms. Fuel injector characterization functions convert the desired fuel mass into an injector on time, which is executed by fuel injector outputs of the ECM 20.

Although the vehicle system is shown as including the throttle valve 29 and a throttle actuator module 31, the flow of air into the cylinder 33, may be controlled via the valve actuator module 56. For example, the valve actuator module 56 may adjust position of the intake valve 30 to adjust air flow into the cylinder 33, instead of or in addition to the throttle actuator module 31 adjusting position of the throttle valve 29. The valve actuator module 56 may be used to control air into the cylinder 33 when the throttle valve 29 is not included in the vehicle system 10.

The throttle actuator module 31 may monitor position of the throttle valve 29 using one or more throttle position sensors (TPS) 100. Throttle position signals THR1 101 and THR2 102 may be transmitted between the throttle actuator module 31 and the ECM 20. The first throttle position signal THR1 101 may indicate to the ECM 20 and/or the stop-start control module 26 position of the throttle valve 29. The second throttle position signal THR2 102 may be transmitted from the ECM 20 to the throttle actuator module 31 to command a throttle valve position. In one implementation, the signals TPS1, TPS2 from the sensors 100 may be used to determine a redundant, single throttle position. Each of the signals TPS1, TPS2 from the sensors 100 may be used to perform diagnostics on the other one of the signals TPS1, TPS2. Vehicle speed may be determined via a vehicle speed sensor 99 to generate a vehicle speed signal Vspd 108.

The control modules of the vehicle system 10 may communicate with each other via serial and/or parallel connections and/or via a control area network (CAN) 105. For example, the ECM 20 may communicate with the TCM 22 to coordinate shifting gears in the transmission system 16 and adjust reduce torque during a gear shift. As another example, the ECM 20 may communicate with a HCM 24 to coordinate operation of the ICE 14 and the motor/generator 18. The motor/generator 18 may be used to: assist the ICE 14; replace power from the ICE 14, and/or start the ICE 14. In addition, the control modules may share parameter values associated with determining whether to perform an autostart and an autostop.

The transmission system 16 includes a transmission 106 and a torque converter 107 and may include an auxiliary pump 110. The auxiliary pump 110 is external to the transmission 106 and maintains fluid pressure within the transmission 106 to maintain engagement of gear(s) and/or clutch(es). For example, a first gear may be held in an engaged state during a neutral idle mode using the auxiliary pump 110. Devices other than the auxiliary pump 110 may be used to maintain pressure, such as an accumulator.

In various implementations, the ECM 20, the TCM 22, the HCM 24 and other control modules of the vehicle system 10 may be integrated into one or more modules.

Figure 2:
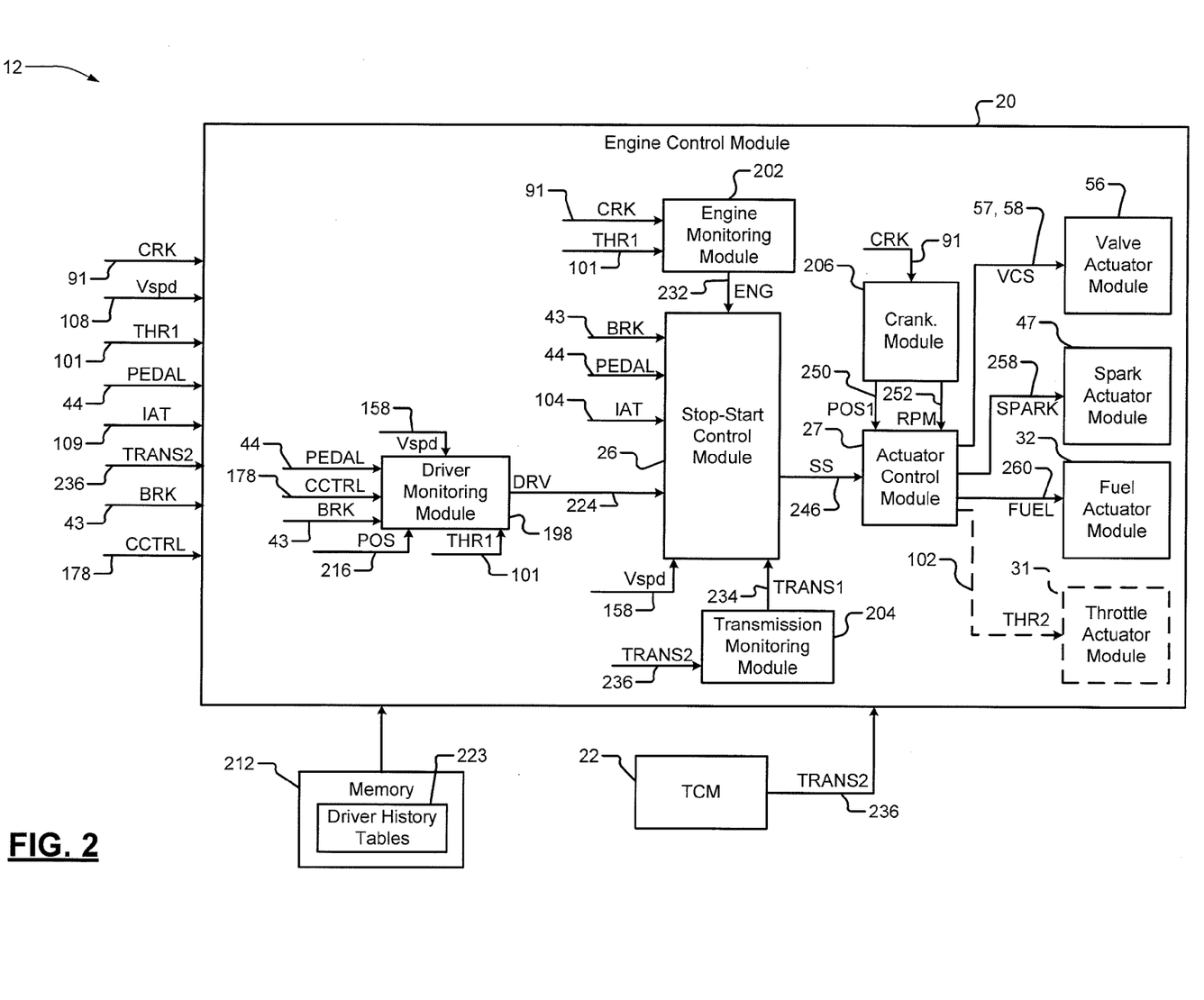
FIG. 2 is a functional block diagram of a portion of the stop-start system of FIG. 1 incorporating an engine control module in accordance with the present disclosure.

Referring now also to FIG. 2, a portion of the stop-start system 12 is shown. The stop-start system 12 includes the ECM 20 and the TCM 22. The ECM 20 includes the stop-start control module 26 and the actuator control module 27. The stop-start control module 26 initiates autostops (shutdowns) and autostarts (restarts) of the ICE 14. The actuator control module 27 controls operation of the ICE 14 during the autostarts and autostops. The stop-start control module 26 and the actuator control module 27 may perform autostarts and autostops based on information received from various sensors, systems and/or modules of the vehicle system 10 and the stop-start system 12. Some of these sensors, systems and modules and corresponding signals are shown in FIG. 2.

The sensors may include, for example, the brake sensor 41, the accelerator pedal sensor 42, the engine speed sensor 90, the vehicle speed sensor 99, the throttle position sensors 100 (or throttle actuator module), an intake air temperature sensor 104, and other sensors such as an ambient temperature sensor. The sensors 41, 42, 90, 99, 104 provide the brake signal BRK 43, the accelerator pedal signal PEDAL 44, the crankshaft signal CRK 91, a vehicle speed signal Vspd 108, and an intake air temperature signal IAT 109. The throttle position sensors 100 may provide throttle position signals, which may be received by the throttle actuator module 31 and/or by the ECM 20. The throttle actuator module 31 and/or the ECM 20 may generate the first throttle position signal THR1 101.

The stop-start system 12 may further include a driver monitoring module 198, an engine monitoring module 202, and a transmission monitoring module 204, the actuator control module 27, a crankshaft module 206, the valve actuator module 56, the spark actuator module 47, the fuel actuator module 32, and/or the throttle actuator module 31. The driver monitoring module 198 monitors current driver behavioral activity and stores driver behavioral information in driver history tables 223 in the memory 212. The driver monitoring module 198 may monitor one or more of the signals BRK 43, PEDAL 44, THR1 101, Vspd 108, and a cruise control signal CCTRL 178 and generates a driver signal DRV 224 indicating expected driver behavior information. The behavioral information may include accelerator pedal positions, vehicle acceleration values, vehicle speeds, amounts of time at accelerator pedal positions, amounts of time at throttle positions, amounts of time at brake pedal positions, brake pressures, brake pressure apply periods, cruise control states, power request history of the driver to the drivetrain, etc.

The engine monitoring module 202 monitors states of the ICE 14 including, for example, engine speed and throttle position. The engine monitoring module 202 may generate an engine signal ENG 232 based on the signals CRK 91 and THR1 101.

The transmission monitoring module 204 monitors states of the transmission and generates a first transmission status signal TRANS1 234. The transmission monitoring module 204 may generate the first transmission status signal TRANS1 234 based on a second transmission status signal TRANS2 236 from the TCM 22. The first transmission status signal TRANS1 234 may indicate: a current gear of the transmission 106; whether the transmission 106 is operating in a tow mode; a load on the transmission 106; etc. The load on the transmission 106 may be determined, for example, based on an engine speed, torque profiles of the ICE 14 and transmission 106, and/or outputs of one or more strain and/or pressure sensors.

As an example, the stop-start control module 26 may initiate the autostarts and autostops based on one or more of the signals BRK 43, PEDAL 44, DRV 224, and TRANS1 234. The stop-start control module 26 generates a stop-start signal SS 246 to request that an autostart or an autostop be performed. As an example, when a shifter of the transmission 106 transitions from a drive (D) position to a neutral (N) position, a reverse (R) position, a first gear (D1) position, a second gear (D2) position, etc., the TCM 22 may request that an autostop be inhibited and/or that an autostart be performed.

The crankshaft module 206 monitors the crankshaft signal CRK 91 and generates a first position signal POS1 250 and an engine speed signal RPM 252, which are provided to the actuator control module 27. The actuator control module 27 performs autostarts and autostops based on the stop-start signal SS 246. The actuator control module 27 generates one or more of the second throttle signal THR2 102, the valve control signals VCS1 57, VCS2 58, a spark control signal SPARK 258, and a fuel control signal FUEL 260 based on the stop-start signal SS 246.

The actuator modules 31, 32, 47 and 56 may adjust fuel, air flow, spark, and intake and exhaust valve parameters for each of the cylinders of the ICE 14 in response to the signals SPARK 258, FUEL 260, THR2 102, VCS1 57, VCS2 58. The fuel parameters may include, for example, fuel injection quantity, fuel injection pressure, fuel injection timing, etc. The air flow parameters may include air volumes, air pressures, etc. The spark parameters may include, for example, spark energy and spark timing. The intake and exhaust valve parameters may include positions for each of the valves 30, 51.

Figure 3:
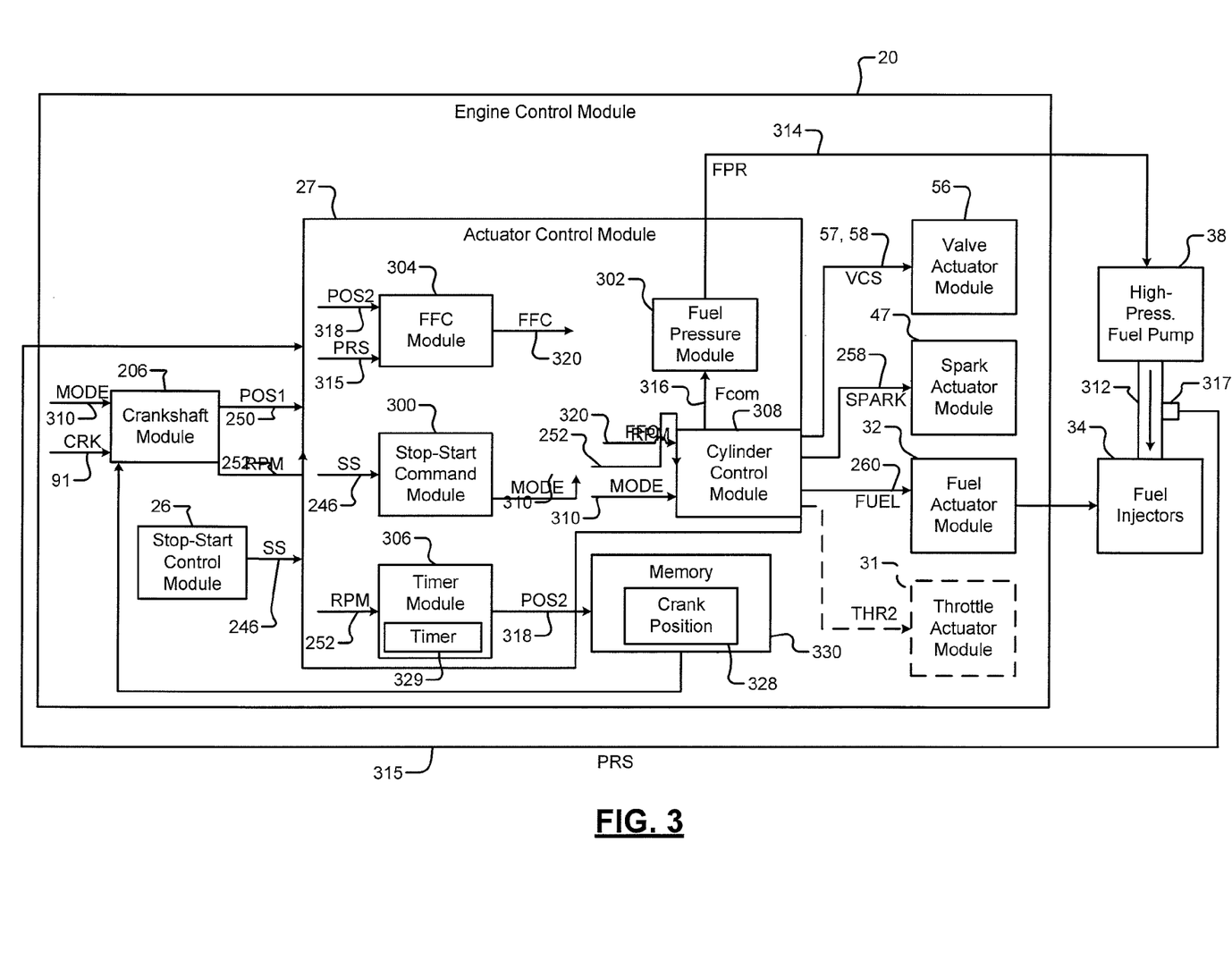
FIG. 3 is a functional block diagram of another portion of the stop-start system of FIG. 1 incorporating an actuator control module in accordance with the present disclosure.

Referring now also to FIG. 3, a portion of the stop-start system 12 is shown. The stop-start system 12 includes the ECM 20, which includes the stop-start control module 26, the actuator control module 27, and the actuator modules 31, 32, 47 and 56. The actuator control module 27 includes a stop-start command module 300, a fuel pressure module 302, a first firing cylinder (FFC) module 304, a timer module 306, and a cylinder control module 308.

The stop-start command module 300 detects when to initiate an autostop or an autostart based on the stop-start control signal 246. The stop-start command module 300 generates a mode signal MODE 310 indicating operation in an autostart mode or an autostop mode.

The fuel pressure module 302 monitors pressure within a fuel rail 312 and generates a fuel pressure signal FRP 314. The fuel pressure module 302 may monitor pressure in the fuel rail 312 based on a fuel pressure signal PRS 315 from a fuel pressure sensor 317 on the fuel rail 312. The fuel pressure control signal FRP 314 is provided to the fuel pump 38 to generate a selected fuel pressure in the fuel rail 312. The fuel pressure module 302 may adjust pressure within the fuel rail 312 based on a fuel pressure command signal Fcom 316.

The FFC module 304 determines which one of the pistons in the cylinders of the ICE 14 is closest to and approaching top-dead-center (TDC) after a command is generated to crank the ICE 14 and the current fuel pressure measurement PRS 315 is above a predetermined level. TDC refers to a position of a piston when the piston is at a highest position or a position farthest from the axis of rotation of the crankshaft and closest to corresponding intake and exhaust valves. The FFC module 304 determines the position of the pistons based on a first position signal POS1 250 and the current fuel pressure measurement PRS 315, and generates a first firing cylinder signal FFC 320. The second position signal POS2 318 indicates a crankshaft position 328 when the engine speed signal RPM is equal to 0 for a predetermined period of time.

The timer module 306 sets the second position signal POS2 318 when the engine speed signal 252 is equal to 0 for the predetermined period as measured by a timer 329. The crankshaft position 328 indicated by the second position signal POS2 318 is set equal to the crankshaft position indicated in the first position signal POS1 when the engine speed is 0 for the predetermined period. The crankshaft position 328 may be stored in memory 330 and accessed by the FFC module 304. The second position signal POS2 318 is stored in memory 330 and used as an initial position of the crankshaft 50 for engine timing synchronization when the ICE 14 is restarted.

The cylinder control module 308 generates one or more of the second throttle signal THR2 102, the valve control signals VCS1 57, VCS2 58, a spark control signal SPARK 258, and a fuel control signal FUEL 260 based on the first cylinder signal FFC 320, the engine speed signal RPM 252, and the mode signal MODE 310.

Figure 4:
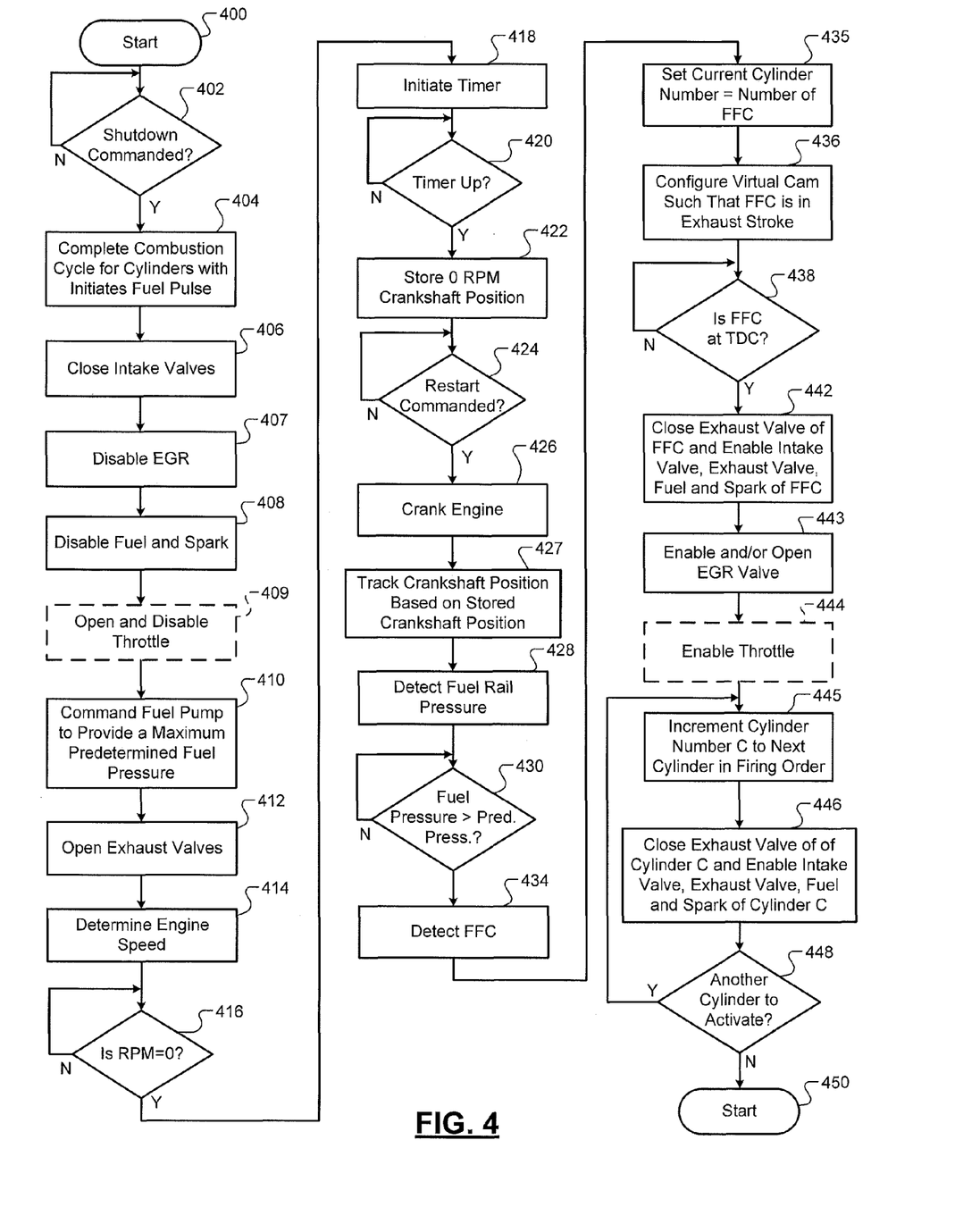
FIG. 4 illustrates a stop-start method in accordance with the present disclosure.

The vehicle system 10 and the stop-start system 12 of FIGS. 1-3 may be operated using numerous methods, an example method is provided by the method of FIG. 4. In FIG. 4, a stop-start method is shown. Although the following tasks are primarily described with respect to the implementations of FIGS. 1 and 2, the tasks may be easily modified to apply to other implementations of the present disclosure. Also, although a certain number of conditions are described with respect to the following tasks, the method may incorporate other conditions disclosed herein when performing an autostart and an autostop. The tasks may be iteratively performed. The method may begin at 400 with the ICE 14 running.

At 402, the stop-start command module 300 determines whether an autostop (shutdown) has been commanded by the stop—start control module 26. If an autostop has been commanded, the stop-start command module 300 generates the mode signal MODE 310 indicating operation in the shutdown mode.

Although the following tasks 404-410 are shown as individual tasks, the tasks may be performed during the same time period and/or in a different order. At 404, the cylinder control module shuts down the cylinders sequentially (one-at-a-time). Although the cylinders are shutdown sequentially, shutdown periods of the cylinders may overlap. In other words, a second cylinder may begin shutting down prior to a first cylinder finishing shutting down.

Any one of the cylinders may be the first cylinder to be shutdown. The next cylinder to be shutdown would be the cylinder subsequent to the first cylinder in a firing order of the cylinders. The remaining cylinders are similarly shutdown in a sequential order and/or according to the firing order of the cylinders. The firing order refers to an order in which spark is provided to the cylinders and/or the order in which air/fuel mixtures in the cylinders are ignited during operation of the ICE 14. As an example, in a V6 engine, the firing order of the six cylinders may be 1-2-3-4-5-6 or some other firing order, such as 1-4-3-6-2-5.

Combustion cycles of the cylinders are completed prior to fuel and spark of the cylinders being disabled. An end of a combustion cycle of a cylinder is defined as a start of an exhaust stroke of that cylinder. If a cylinder is in the middle of a fuel pulse of a current combustion cycle and/or is in a combustion cycle state that is subsequent to the fuel pulse of the current combustion cycle, the current combustion cycle is completed. If a cylinder is in a combustion cycle state that is prior to a fuel pulse for a current combustion cycle, the cylinder control module may disable fuel and spark to that cylinder prior to completing the current combustion cycle.

At 406, intake valves of the cylinders are closed subsequent to respective current intake strokes and/or intake strokes of current combustion cycles. The intake valves are maintained in a closed state until an autostart and/or task 442 and/or task 446 are performed. This prevents air from being pumped into the intake valves during a shutdown of the ICE 14.

By preventing air from being pumped into the cylinders during a shutdown of the ICE 14, time for the ICE 14 to reach 0 RPM may be increased and cooling of the catalyst 59 and build up of oxygen $O_2$ in the catalyst 59 are minimized. This may allow for a "flying" restart of the ICE 14. A flying restart refers to when the ICE 14 is restarted prior to being completely shutdown. For example, an autostop may be initiated and during shutdown of the ICE 14, the vehicle operator may depress the accelerator 40. The stop-start control module 26 may request an autostart based on the pedal signal PEDAL 44 and prior to the speed of the ICE 14 decreasing to 0 RPM.

Also, since the shutdown time is increased and less cool air is being pumped into the exhaust system 52 during a shutdown, the catalyst 59 may remain at activation temperature for a longer period of time. For this reason, the catalyst 59 may be at or greater than an activation temperature when the ICE 14 is restarted. This allows the catalyst 59 to operate efficiently upon startup, which minimizes exhaust emissions. Also, as oxygen $O_2$ build up in the catalyst 59 is minimized, additional fuel may not need to be injected into the cylinder 33 to use up the oxygen $O_2$ stored in the catalyst 59. This can improve fuel economy.

At 407, the ECM 20 and/or actuator control module 27 may disable or close the EGR valve 53. At 408, fuel and spark of the cylinders is disabled. The fuel and spark may be disabled upon completing respective combustion cycles of the cylinders and/or during the exhaust strokes of the cylinders. At 409, if included in the vehicle system 10, the ECM 20 and/or actuator control module 27 may disable the throttle valve 29 and/or adjust position of the throttle valve 29 to a partially or fully open position. This allows the pressure within the intake manifold 28 to be at atmospheric pressure when the ICE 14 is restarted.

At 410, the fuel pressure module 302 commands the fuel pump 38 to increase pressure in the fuel rail 312 to a predetermined maximum pressure. The predetermined maximum pressure may be set based on characteristics of physical components of a fuel system of the ICE 14 and/or safety standards. The characteristics may refer to predetermined maximum pressures for fuel rails, fuel lines, fuel injectors, fuel pumps, etc. This increases pressure in the fuel rail such that the pressure in the fuel rail remains above a predetermined pressure for a maximum amount of time.

The amount of time that the fuel pressure in the fuel rail remains above the predetermined pressure depends upon the leak rate of the fuel injectors and the fuel pump 38. For example, fuel in the fuel rail may leak past the fuel pump and back into a low-pressure fuel line. The low-pressure fuel line may be used to supply fuel to the fuel pump 38. Maintaining the fuel rail pressure above a predetermined pressure for a maximum amount of time facilitates quick autostarts, since fuel to the cylinders is not enabled until fuel pressure in the fuel rail is greater than or equal to the predetermined pressure. Delays associated with increasing fuel pressure during an autostart are minimized and/or prevented by maximizing the fuel pressure during shutdown.

At 412, the exhaust valves of the cylinders are opened during the exhaust strokes of the current combustion cycle and are then remained in an open state during subsequent cycles of the ICE 14 or crankshaft 50. The position of the crankshaft 50 may be monitored to assure that the cylinders are finished with their last combustion cycle before maintaining the exhaust valves in an open state. A cycle of the crankshaft 50 refers to one revolution of the crankshaft 50, unlike one combustion cycle which includes two revolutions of the crankshaft. The exhaust valves are maintained in an open state until an autostart and/or task 442 and/or task 446 are performed.

In summary of the above tasks 404-412, each of the cylinders is shutdown sequentially. During the shutdown, each cylinder completes a current combustion cycle or no longer performs a combustion cycle. During the combustion cycles the intake valves are closed and the exhaust valves are opened. Subsequent to the combustion cycles, the intake valves are maintained in a closed state and the exhaust valves are maintained in an open state while speed of the ICE 14 decreases to 0 RPM. The open position of the exhaust valves may be the same or different. The open position of the exhaust valves may be constant while speed of the ICE 14 decreases to 0 RPM or may vary based on a predetermined profile. The speed of the ICE 14 may be ramped down at a predetermined rate based on the predetermined profile.

As an example, all of the exhaust valves may be maintained at an open position A (or A millimeters from closed). The open position A may be a maximum open position for maximum exhaust flow with no valve interference between the tops of the pistons and the exhaust valves. As another example, the open positions of the exhaust valves may vary during a shutdown and cycles of the crankshaft based on velocity of the crankshaft and/or velocity of the pistons in the cylinders. The profile may be stored in the memory 330 and used to provide dynamic adjustment in exhaust valve positions for maintaining a constant engine torque. As velocity of the crankshaft increases, the open positions of the exhaust valves may be increased. As velocity of the crankshaft decreases, the open positions of the exhaust valves may be decreased.

Position of the exhaust valves adjusts a deceleration rate of the crankshaft. A larger the opening the slower the deceleration rate. By reducing the deceleration rate, the probability that an autostart is requested prior to the engine speed reaching 0 RPM is increased.

As air is not being pumped into the cylinders through the intake valves and the exhaust valves are in an open state, pressure in the cylinders during a compression stroke is minimized, which prevents reverse rotation of the crankshaft 50. This allows for quick determination of crankshaft position during an autostart and thus quick restart of the ICE 14. Position of the crankshaft 50 is more easily determined when reverse rotation is prevented. By preventing reverse rotation of the crankshaft 50, a single element position sensor may be used to detect position of the crankshaft 50, as opposed to a multi-element position sensor. Since the crankshaft 50 can only rotate in a forward or positive direction, a dual element position sensor is not needed to detect when the crankshaft 50 rotates in a reverse direction.

At 414, the crankshaft module 206 determines speed of the ICE 14. The crankshaft module 206 generates the engine speed signal RPM 252.

At 416, the timer module 306 determines whether the engine speed is equal to 0. Task 418 is performed when the engine speed measurement RPM 252 is equal to 0. At 418, the timer module 306 initiates the timer 329. At 420, the timer module determined whether the engine speed measurement RPM 252 has been equal to 0 for the predetermined period and/or the timer 329 is up. This assures that the true speed of the crankshaft 50 is 0 and the engine speed determination is accurate prior to proceeding to task 422. The predetermined period may be, for example, 50 milliseconds (ms). At 422, the timer module stores a latest crankshaft position ("crank position") in the memory 330 when the engine speed has been equal to 0 RPM for the predetermined period and/or when the timer is up. The crankshaft position may be, for example, 0-359°.

At 424, the stop-start command module determines whether an autostart (restart) is commanded by the stop-start control module 26. Task 426 is performed when a restart is requested. At 426, the ECM 20 instructs the HCM 24, the motor/generator 18, and/or a starter to crank the ICE 14.

At 427, the crankshaft module 206 begins tracking position of the crankshaft 50 based on the mode signal MODE 310. The crankshaft module 206 determines the initial position of the crankshaft 50 when cranking is started based on the stored crankshaft position 328 and the crankshaft signal CRK 91. The crankshaft module 206 generates the first position signal POS1 250 based on the stored crankshaft position 328 and the crankshaft signal CRK 91.

At 428, the fuel rail pressure is detected. The fuel pressure module 302 determines a current fuel rail pressure based on the fuel pressure signal PRS 315. At 430, the cylinder control module 308 and/or the fuel pressure module 302 determines whether the fuel pressure in the fuel rail 312 is greater than the predetermined pressure. Task 434 is performed when the fuel pressure is greater than the predetermined pressure. This assures that fuel rail pressure is adequate for a restart of the ICE 14.

At 434, the FFC module 304 determines which cylinder has a piston closest to approaching TDC. The cylinder with a piston closest to approaching TDC is identified as the FFC. The FFC module 304 may determine the FFC based on the first position signal POS1 250 generated at 427. At 435, the cylinder control module 308 sets a current cylinder number C equal to a cylinder number of the FFC.

At 436, the cylinder control module 308 configures a virtual camshaft. The virtual camshaft does not refer to a physical camshaft, as the ICE 14 does not have a camshaft. The virtual camshaft refers to timing relationships between (i) the positions of the crankshaft 50 and/or pistons of cylinders of the ICE 14 and (ii) positions of the intake and exhaust valves of the ICE 14. The virtual camshaft is configured such that the FFC is in an exhaust stroke, as the FFC has a piston closest to approaching TDC and is about to start an intake stroke.

Timing of intake and exhaust valve positions is set such that the FFC begins an intake stroke upon reaching TDC. Timing of other intake and exhaust valve positions is set such that the remaining cylinders sequentially begin an intake stroke in the predetermined firing order of the ICE 14. This synchronizes the intake and exhaust valves of the cylinders relative to each other and relative to the crankshaft 50 and pistons. Although the cylinders are reactivated sequentially (one-at-a-time), a second cylinder may begin an intake stroke prior to a first cylinder (or FFC) finishing an activation period. An activation period refers to a period when intake and exhaust valves, fuel and spark are enabled for a cylinder.

At 438, the cylinder control module 308 determines whether the FFC is at TDC. If the FFC is at TDC, task 442 is performed. At 442, the cylinder control module 308 via the valve actuator module 56 closes the exhaust valve of the FFC and enables the intake valve of the FFC. Fuel and spark of the FFC are also enabled. This allows the FFC to begin a combustion cycle starting with an intake stroke. At 443, if included in the vehicle system 10, the EGR valve 53 may be enabled. At 444, if included in the vehicle system 10, the throttle valve 29 may be enabled.

At 445, the cylinder control module increments or changes the cylinder number C to the cylinder number of the next cylinder from the FFC in the predetermined firing order. At 446, the cylinder control module 308 via the valve actuator module 56 closes the exhaust valve of the cylinder having the current cylinder number C ("current cylinder C") and enables the intake valve of the current cylinder C. Fuel and spark of the current cylinder C are also enabled. This allows the current cylinder C to begin a combustion cycle starting with an intake stroke.

At 448, the cylinder control module 308 determines whether another cylinder is to be activated. If there is another cylinder to activate, task 445 is performed, otherwise the method may end at 450. Task 402 may be performed subsequent to task 448 when the method is iteratively performed. Also the method may skip or transition from performing one of tasks 404-422 to task 424 when a restart or flying restart is requested.

The above-described tasks are meant to be illustrative examples; the tasks may be performed sequentially, synchronously, simultaneously, continuously, during overlapping time periods or in a different order depending upon the application.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A vehicle system comprising:
 a stop-start command module configured to detect an autostop request and generate a mode signal based on the autostop request;
 a cylinder control module configured to sequentially disable cylinders of an engine during an autostop mode based on the mode signal, wherein the cylinders of the engine include respective intake valves and exhaust valves, and
 wherein the cylinder control module is configured to maintain the intake valves in a closed state and the exhaust valves in an open state during the autostop mode and during a plurality of cycles of a crankshaft of the engine;
 a timer module configured to (i) measure an amount of time that a speed of the engine is equal to 0 during the autostop mode, and (ii) based on the measured amount of time, determine whether the speed of the engine is equal to 0 for a predetermined period during the autostop mode, wherein the timer module is configured to store a first position of the crankshaft in response to the speed of the engine being equal to 0 for at least the predetermined period; and a crankshaft module configured to determine a second position based on the first position during an autostart mode.

2. The vehicle system of claim 1, further comprising a pressure module configured to set a fuel pressure in a fuel rail of the engine to a predetermined fuel pressure based on a fuel command signal and during the autostop mode, wherein:

the cylinder control module is configured to generate the fuel command signal when the intake valves are closed; and the predetermined fuel pressure is a maximum fuel pressure.

3. The vehicle system of claim 1, wherein the cylinder control module is configured to sequentially disable the cylinders during the autostop mode and in a predetermined firing order of the cylinders.

4. The vehicle system of claim 1, further comprising a first firing cylinder (FFC) module configured to determine a FFC, wherein the cylinder control module is configured to sequentially reactivate the cylinders during the autostart mode beginning with the FFC and based on a predetermined firing order.

5. The vehicle system of claim 4, wherein the FFC module is configured to identify one of the cylinders, which is closest to approaching top dead center, as the FFC.

6. The vehicle system of claim 4, further comprising a pressure module configured to detect a fuel pressure in a fuel rail of the engine, wherein:

the stop-start command module is configured to detect an autostart request and generate the mode signal based on the autostart request; and if fuel to the cylinders of the engine is disabled and the fuel pressure is greater than a predetermined pressure, the FFC module is configured to determine the FFC based on the detected fuel pressure.

7. The vehicle system of claim 4, further comprising an engine control module configured to crank the engine during the autostart mode indicated by the mode signal, wherein:

during the autostart mode, the crankshaft module is configured to determine the second position of the crankshaft of the engine based on the mode signal;

the stop-start command module is configured to detect an autostart request and generate the mode signal based on the autostart request to initiate the autostart mode; and the FFC module is configured to determine the FFC based on the second position.

8. The vehicle system of claim 1, further comprising an engine control module configured to close an exhaust recirculation valve and open a throttle valve during the autostop mode, wherein the engine control module is configured to maintain the exhaust recirculation valve in a closed state and the throttle valve in an open state until an autostart is requested.

9. A method comprising:

detecting an autostop request and generating a mode signal based on the autostop request;

sequentially disabling cylinders of an engine during an autostop mode based on the mode signal, wherein the cylinders of the engine include respective intake valves and exhaust valves;

maintaining the intake valves in a closed state and the exhaust valves in an open state during the autostop mode and during a plurality of cycles of a crankshaft of the engine;

measuring an amount of time that a speed of the engine is equal to 0 during the autostop mode;

based on the measured amount of time, determining whether the speed of the engine is equal to 0 for a predetermined period during the autostop mode;

storing a first position of the crankshaft in response to the speed of the engine being equal to 0 for at least the predetermined period; and determining a second position based on the first position during an autostart mode.

10. The method of claim 9, further comprising:

setting a fuel pressure in a fuel rail of the engine to a predetermined fuel pressure based on a fuel command signal and during the autostop mode; and generating the fuel command signal when the intake valves are closed, wherein the predetermined fuel pressure is a maximum fuel pressure.

11. The method of claim 9, further comprising disabling the cylinders sequentially during the autostop mode and in a predetermined firing order of the cylinders.

12. The method of claim 9, further comprising:

determining a first firing cylinder (FFC);

sequentially reactivating the cylinders during an autostart mode beginning with the FFC and based on a predetermined firing order;

detecting a fuel pressure in a fuel rail of the engine;

detecting an autostart request;

generating the mode signal based on the autostart request;

determining the FFC if the fuel pressure is greater than a predetermined pressure; and identifying one of the cylinders, which is closest to approaching top dead center, as the FFC.

13. The method of claim 9, further comprising:

determining a first firing cylinder (FFC);

sequentially reactivating the cylinders during an autostart mode beginning with the FFC and based on a predetermined firing order;

cranking the engine during the autostart mode indicated by the mode signal, wherein the crankshaft is in a first position prior to or at a beginning of the autostart mode;

during the autostart mode, determining a second position of the crankshaft based on the mode signal and the first position;

detecting an autostart request and generating the mode signal based on the autostart request to initiate the autostart mode; and determining the FFC based on the second position.

14. The method of claim 9, further comprising:

closing an exhaust recirculation valve and opening a throttle valve during the autostop mode; and maintaining the exhaust recirculation valve in a closed state and the throttle valve in an open state until an autostart is requested.

15. The vehicle system of claim 2, wherein the cylinder control module is configured to:

disable fuel to the cylinders; and if the intake valves are closed, generate the fuel command signal (i) subsequent to disabling fuel to the cylinders, (ii) prior to the speed of the engine decreasing to 0, and (iii) prior to maintaining the exhaust valves in the open state.

16. The vehicle system of claim 15, wherein, if the speed of the engine is 0, the first position of the crankshaft is stored (i) subsequent to an end of the predetermined period, and (ii) subsequent to maintaining the exhaust valves in the open state.

17. The method of claim 9, wherein:
- the sequentially disabling of the cylinders of the engine includes leaving the exhaust valves in respective open positions;
- at least one of the open positions is different than the other ones of the open positions; and
- maintaining the exhaust valves in the respective open positions during the autostop mode, wherein the respective open positions are based on a velocity of the crankshaft.

18. The method of claim 9, further comprising reducing a deceleration rate of a velocity of the crankshaft including maintaining the exhaust valves in a fully open positions during the autostop mode, wherein sequentially leaving the exhaust valves open includes leaving the exhaust valves in the fully open positions.

* * * * *